UNITED STATES PATENT OFFICE.

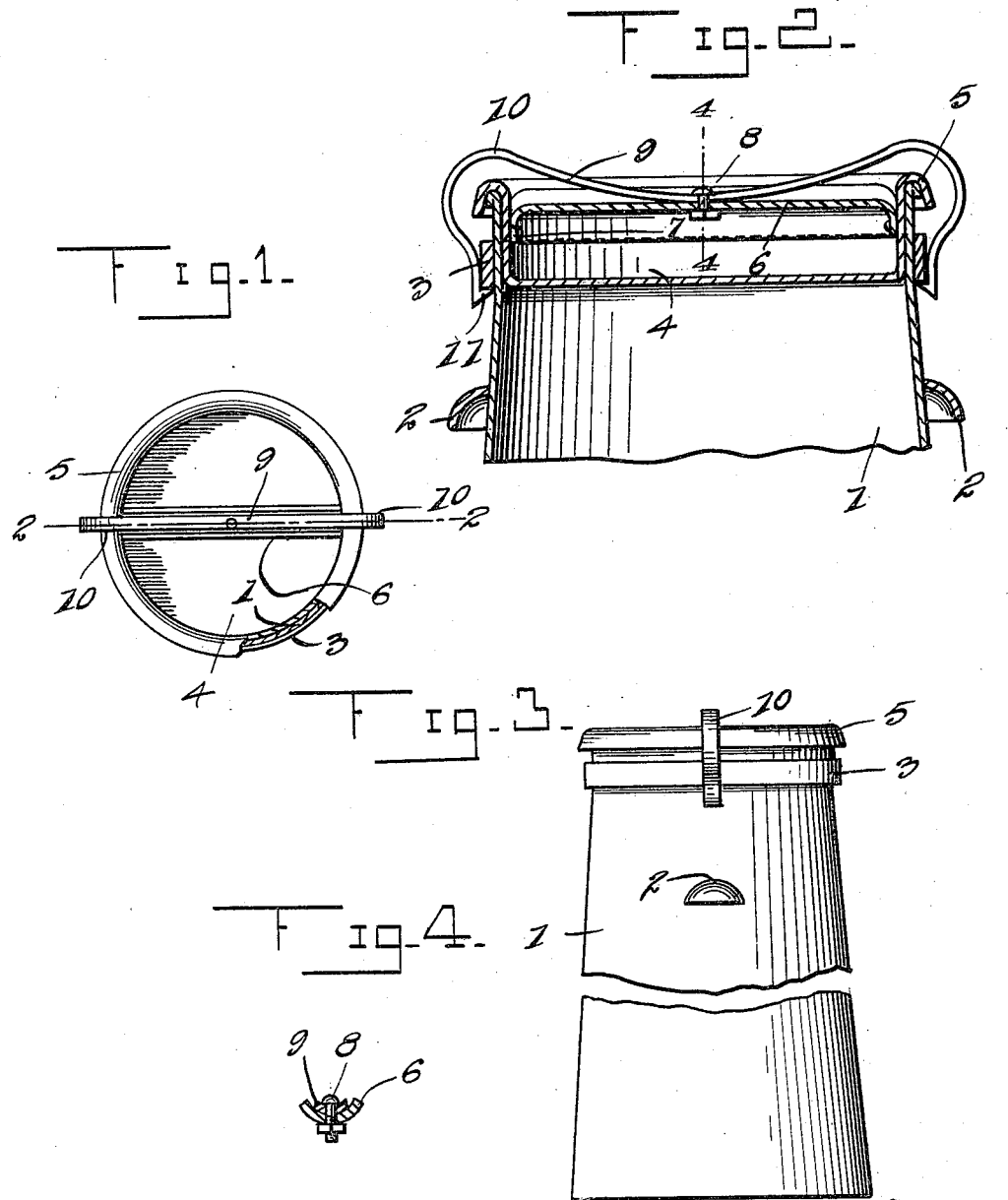

EUGENE W. HUSTED, LARS SORENSEN, AND PHILIP MURPHY, OF HOLTON, MICHIGAN.

MILK-CAN AND COVER AND FASTENING MEANS FOR THE SAME.

1,134,856.   Specification of Letters Patent.   Patented Apr. 6, 1915.

Application filed August 3, 1914. Serial No. 854,755.

*To all whom it may concern:*

Be it known that we, EUGENE W. HUSTED, LARS SORENSEN, and PHILIP MURPHY, citizens of the United States, residing at Holton, in the county of Muskegon and State of Michigan, have invented certain new and useful Improvements in Milk-Cans and Covers and Fastening Means for the Same, of which the following is a specification.

This invention comprehends certain new and useful improvements in milk can covers and fastening means for the same and has for its primary object to provide a milk can cover which will be of such construction and secured in position in such manner that the contents thereof will be thoroughly protected.

This invention has for another object to provide an improved form of cover and fastener which will be constructed in such manner that it will be unnecessary to form seams in any portion of the can within which cream and dirt may accumulate to mix with the contents of the can and spoil the same, thereby making it possible to thoroughly protect the contents of the can during transportation of the milk and cream, the upper portion of the can as well as the cover and securing means being of such construction that all of the parts may be readily and thoroughly cleansed after use of the device.

With these and other objects in view as will become more apparent as the description proceeds the invention consists in certain novel features of construction, combination and arrangement of parts as will be hereinafter more fully described and claimed.

For a complete understanding of our invention, reference is to be had to the following description and accompanying drawings, in which—

Figure 1 is a top plan view of our improved device, Fig. 2 is an enlarged detail vertical section on the plane of line 2—2 of Fig. 1, Fig. 3 is a side elevation of a can provided with a cover and securing means constructed in accordance with our invention, and Fig. 4 is a fragmentary detail section on the plane of line 4—4 of Fig. 2.

Referring more particularly to the drawings in which similar reference characters designate corresponding parts throughout the several views, 1 designates a milk can provided with the usual handles 2 upon opposite sides and tapering gradually toward its upper end around which is secured a band 3 to receive the cover securing means, as will presently be clearly apparent.

Removably positioned in the upper end of the milk can 1 is the cover 4 which is preferably formed of pressed metal with its central portion positioned downwardly and the edge directed upwardly and turned outwardly to form the outwardly directed annular flange 5 engaged over the edge of the milk can 1 to prevent foreign matter from entering said milk can, it being understood that the upstanding edge of the cover 4 is snugly engaged against the inner face of the can 1, around the upper edge thereof. It will be readily seen that by forming the cover 4 in this manner and securing the band 3 to the outer face of the milk can 1, it will be unnecessary to form any seams in the can within which cream and dirt may accumulate to later mix with the contents of the milk can 1 and ruining said contents.

Positioned transversely in the cover 4 and secured therein, is a handle bar 6 which is preferably formed of a transversely curved bar with the opposite ends 7 bent downwardly and secured to the cover 4 at diametrically opposite points of the upstanding edge thereof with the concave face of said handle bar positioned upwardly, as will be clearly understood by referring to the drawings.

Positioned longitudinally in the handle bar 6 and having its central portion secured therein, as shown at 8, is a spring clamp member 9 which has its opposite ends curved upwardly and over the flange 5 and spaced sufficiently from said flange to avoid contact therewith, as shown at 10. The tapered ends are then brought inwardly and directed downwardly and provided with the inwardly directed ring engaging lugs 11 which will automatically engage beneath the band 3 as the cover 4 is forced into position and the ends 10 of the spring clamp member 9 forced downwardly, thereby preventing accidental disengagement of the ends of the spring clamp member 9 or withdrawal of the cover 4, as the curved end 10 of said spring clamp member 9 will serve to resiliently retain the lugs 11 in operative position. It will be evident, however, that the lugs 11 may be readily drawn outwardly and disengage from the band 3 when it is desired to remove the cover 4.

While we have shown and described the preferred embodiment of our invention, it will be understood that minor changes in the details of construction, combination and arrangement of parts may be made without departing from the spirit and scope of the invention as claimed or sacrificing any of the advantages thereof.

What is claimed is:—

A device of the class described comprising a milk can having an opening in one end, a band secured to said milk can adjacent the opening, of a cover formed of a single piece of metal having an upstanding portion formed on its outer periphery, the free ends of said upstanding portion being curved downwardly to engage the top edges of said milk can, said cover to seat within the opening of the milk can, a handle bar adapted to seat down within the cover, the edges engaging one face of said cover member and secured to said bar, a spring member secured to said bar, said spring member extending upwardly from its pivoted point and curved downwardly and inwardly, and its ends formed into hooks to engage the under surface of said band to hold the cover in place.

In testimony whereof we affix our signatures in presence of two witnesses.

EUGENE W. HUSTED.
LARS SORENSEN.
PHILIP MURPHY.

Witnesses:
MARVIN E. HUSTED,
PEDER O. PEDERSON.

Copies of this patent may be obtained for five cents each, by addressing the "Commissioner of Patents, Washington, D. C."